Feb. 23, 1932.  M. F. BATES  1,846,578
CONSTANT SPEED DEVICE
Filed June 8, 1928
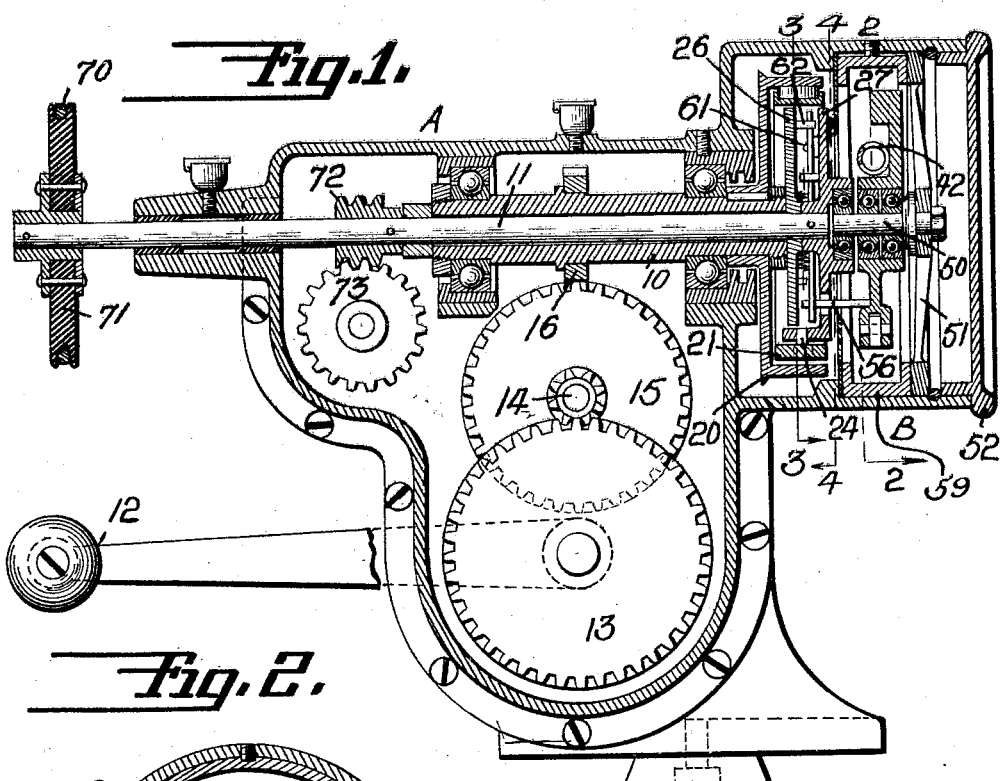
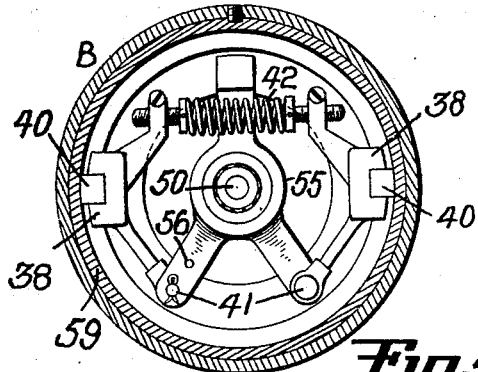
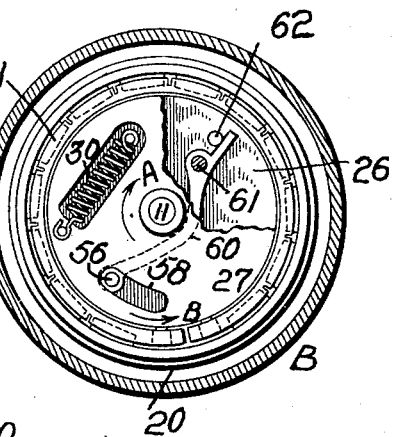
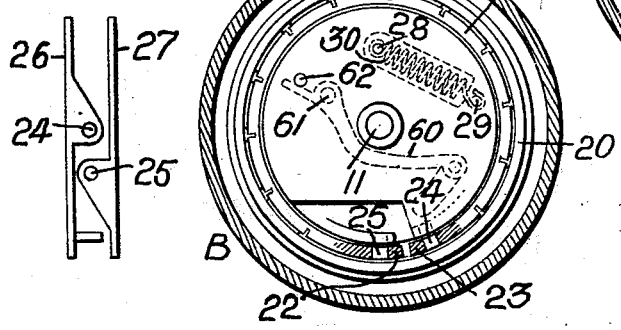
INVENTOR
MORTIMER F. BATES.
BY
Herbert H. Thompson
ATTORNEY.

Patented Feb. 23, 1932

1,846,578

UNITED STATES PATENT OFFICE

MORTIMER F. BATES, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

CONSTANT SPEED DEVICE

Application filed June 8, 1928. Serial No. 283,746.

This invention relates to constant speed devices and particularly to that type of constant speed drives wherein the driving force is relatively so great with respect to the driven load that an ordinary brake governor, such as used on phonographs for example, is insufficient for close regulation. While my invention is capable of broad application, it is particularly serviceable for use in connection with talking motion picture cameras, wherein an irregular speed in the taking of the pictures would result in distortion of sound upon reproduction.

For carrying out my invention I propose to use in addition to the ordinary governor brake a variable torque connection between the driving element and the driven element for dissipating the excess power when the predetermined speed is exceeded.

Other objects and advantages of this invention will become apparent in the following detailed description thereof:

In the accompanying drawings,

Fig. 1 is a vertical section through the portion of a constant speed motor embodying what I now consider to be the preferred form of my invention.

Fig. 2 is a section taken substantially on the line 2—2 of Fig. 1.

Fig. 3 is a section taken substantially on the line 3—3 of Fig. 1.

Fig. 4 is a section taken substantially on the line 4—4 of Fig. 1.

Fig. 5 is a full view of a pair of discs shown in section in Fig. 1.

Referring to the drawings, I have shown a driving element 10 adapted to drive a driven element 11. Said elements may be enclosed and suitably supported in a housing A. Said driving element 10 may be driven either automatically from some sort of motor or by hand through a handle 12 operating through suitable multiplying gearing, such as 13, 14, 15, 16, to drive at a relatively high speed the driving element 10, which in the present instance takes the form of a sleeve or quill surrounding the driven element 11, here shown in the form of a shaft. The driving connection between the driving element 10 and the driven element 11 lies through a clutch drum 20, fixed to the driving quill 10, against whose inner flanged surface there is pressed a split clutch band 21, each of whose open ends 22, 23 is anchored to pins 24, 25 carried by discs 26 and 27, respectively. The said discs are mounted upon shaft 11, the disc 27 fixedly and disc 26 loosely, the said discs being biased by a spring 30 engaging pins 28, 29 on the respective discs in such direction as to separate pins 24 and 25 and hence spread the clutch band 21 so as to maintain the same in engagement with the clutch drum 20. Driving quill 10, therefore, drives through clutch drum 20, clutch band 21 and fixed disc 27 to drive the driven shaft 11 upon which said disc 27 is fixed.

It is the object of my invention to provide means for maintaining the speed of the driven shaft constant, and since the multiplying gearing 13, 16 insures at least the minimum speed, the problem resolves itself into preventing speed of the driven shaft from exceeding a predetermined speed. For this purpose I employ a speed governor which may be in conventional form, such as that shown in Figs. 1 and 2, and may comprise a pair of centrifugal masses 38 movable outwardly by centrifugal force about pivots 41 in response to the centrifugal force which is proportional to the generated speed and against the action of a spring 42 whose tension may be adjusted. Preferably I provide the centrifugal masses with brake shoes 40 adapted to engage brake drum 59 when the governor is expanded. Spring 42 is adjusted to predetermine the speed at which the brake shoes 40 become effective. The said governor may be mounted upon a stud shaft 50 within a spider 51 fixed inside of the extension B of the general housing A, which encloses the hereinbefore described mechanism, the said extension being preferably closed by such means as a cover 52. The speed responsive element 55 of the governor is adapted to be driven by means of a pin 56 extending through a slot 58 in disc 27 so as normally to engage in one end of a lever 60 pivoted upon disc 27 at 61, the other end of said lever engaging a pin 62 fixed to the disc 26 loosely mounted upon shaft 11. As shown, the pivot 61 divides lever 60 into arms of unequal length, the governor and its band 56 acting about the long arm to form a multiplying gearing. The rotation of disc 27 will thus also rotate lever 60 about the axis of shaft 11, but movement of said lever about its own axis 61 is resisted by spring 30 acting upon disc 27 and pin 62. The lever 60, therefore, rotates the pin 56 and the speed governor, so that when a predetermined speed has been reached the brake shoes 40 will engage a brake drum 59 fixed to the inside of housing B. It will be apparent from the drawings that the device shown is adapted for one-way rotation only, since lever 60 engages pin 62 at only one side thereof.

Where the speed of rotation applied to the driving member, in this case by the operator to the handle 12, is relatively great with respect to the force applied by the brake shoes 40, it would be possible to maintain excessive speed in spite of said governor by overcoming the resistance offered by the brake shoes 40 in engagement with drum 59. I obviate this condition by the means hereinbefore described for taking up the said excessive driving speed and preventing it reaching the driven element. When brake shoes 40 engage drum 59, this will cause pin 56 to lag with respect to disc 27 so that said pin will ride down slot 58 and in so doing is caused to actuate lever 60 about its pivot 61. Thus, in Fig. 3, if the discs are rotating in the direction of arrow A and the brake shoes 40 engage their drum, pin 56 will move in the direction of arrow B relative to slot 58. This movement of pin 56 in slot 58 will cause a movement of disc 26 in a direction opposite to the direction of rotation to cause the pins 24 and 25 to approach each other and hence contract the clutch band 21 to permit slipping of the clutch drum 20. Thus it will be seen that the driving connection between the driving and driven elements is permitted to slip when a predetermined speed is exceeded and that in addition the governor maintains the driven element at a predetermined speed. Otherwise stated, there is provided a governor for maintaining a predetermined speed, and excess speed of the driving member, which would otherwise tend to increase the speed of the driven member in spite of the governor, is taken up in the slip friction connection provided between the clutch band 21 and the clutch drum 20.

The friction clutch 20, 21 is thus self-energizing, requiring only slight spring tension, such as provided by spring 30 acting upon the free end 23 of the clutch band which exerts an internal snubbing action on the clutch drum. In consequence of this construction there is required only a slight force acting on the end of lever 60 oppositely to the direction of rotation to slip the clutch band.

The rotation of driven shaft 11 may be utilized for any suitable drive, as, for instance, through a belt and pulley 70, 71, and the revolutions may be registered through some form of gear drive 72, 73 to actuate the usual revolution counter.

In accordance with the provisions of the patent statutes, I have herein described the principle and operation of my invention, together wth the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A constant speed motor comprising a driving element, a driven element, a speed governor for said driven element, and means including a slip friction connection between said elements for taking up excess torques, said last-named means comprising a clutch drum and a split clutch band carried by the driving and driven elements, a pair of relatively movable members, each of said members engaging one end of said band, means normally moving said members relatively to each other to maintain said band in firm contact with said drum, and means whereby said governor controls the relative movement of said members to vary the degree of contact between said drum and said band.

2. A constant speed motor comprising a driving element, a driven element, a speed governor for said driven element, and means including a slip friction connection between said elements for taking up excess torques, said last-named means comprising a clutch drum and a split clutch band carried by the driving and driven elements, a pair of relatively movable members, each of said members engaging one end of said band, means normally moving said members relatively to each other to maintain said band in firm contact with said drum, and a connection between said governor and one of said members whereby said governor moves said last-named member relatively to the other disc when a predetermined speed is reached to vary the degree of contact between said drum and said band.

3. A constant speed motor comprising a driving element, a driven element, a speed governor for said driven element, and means including a slip friction connection between said elements for taking up excess torques, said last-named means comprising a clutch drum and a split clutch band carried by the driving and driven elements, a pair of relatively movable members, each of said members engaging one end of said band, means normally moving said members relatively to each other to maintain said band in firm contact with said drum, and means including a lever pivoted on one of said members and having one arm thereof connected to said other member and the other arm thereof connected to said governor whereby said governor controls the relative movement of said members to vary the degree of contact between said drum and said band.

4. A constant speed motor comprising a driving element, a driven element, a speed governor for said driven element, and means including a slip friction connection between said elements for taking up excess torques, said last-named means comprising a clutch drum and a split clutch band carried by the driving and driven elements, a pair of relatively movable discs, each of said discs engaging one end of said band, means normally moving said discs relatively to each other to maintain said band in firm contact with said drum, and a multiplying connection between said governor and one of said discs whereby said governor moves said last-named disc relative to the other disc when a predetermined speed is reached to vary the degree of contact between said drum and said band, said connection including a lever pivoted on one of said discs to form a long arm and a short arm, said short arm being connected to said other disc and said long arm being connected to said governor.

In testimony whereof I have affixed my signature.

MORTIMER F. BATES.